United States Patent [19]

Kanai et al.

[11] Patent Number: 5,072,321
[45] Date of Patent: Dec. 10, 1991

[54] APPARATUS FOR PROVIDING UNIFORM ATTRACTIVE FORCE TO A MAGNETIC DISK HUB IN A MAGNETIC DISK DRIVE

[75] Inventors: Takashi Kanai; Kunio Miyazaki; Tuzuku Masayuki, all of Komagane, Japan

[73] Assignee: Sankyo Seiki Mfg. Co., Ltd., Nagano, Japan

[21] Appl. No.: 441,386

[22] Filed: Nov. 27, 1989

[30] Foreign Application Priority Data

Nov. 28, 1988 [JP] Japan ................................ 63-300290

[51] Int. Cl.$^5$ ........................ G11B 5/016; G11B 17/02
[52] U.S. Cl. ............................ 360/99.04; 360/99.05; 360/99.08; 360/99.12
[58] Field of Search ................ 360/99.05, 99.08, 99.12

[56] References Cited

U.S. PATENT DOCUMENTS

| 4,570,194 | 2/1986 | Schatteman | 360/99.12 |
| 4,658,311 | 4/1987 | Sakaguchi | 360/99.08 |
| 4,823,337 | 4/1989 | Van Zanten et al. | 360/99.12 |
| 4,896,232 | 1/1990 | Sugawara | 360/99.08 |

Primary Examiner—A. J. Heinz
Assistant Examiner—Jefferson Evans
Attorney, Agent, or Firm—McAulay Fisher Nissen Goldberg & Kiel

[57] ABSTRACT

Apparatus for rotating and driving a magnetic disk in which a hub of a magnetic disk is magnetically attracted against a hub support, and a driving pin provided on the hub support is engaged with an engaging hole provided in the disk hub. The hub support has a magnetic attractive surface which is high in magnetic flux density in the vicinity of the driving pin and continuously and gradually lowers in magnetic flux density as a function of distance from the driving pin, so that the magnetic disk can be attracted by an approximately uniform net attractive force over the entire surface of the hub support.

13 Claims, 4 Drawing Sheets

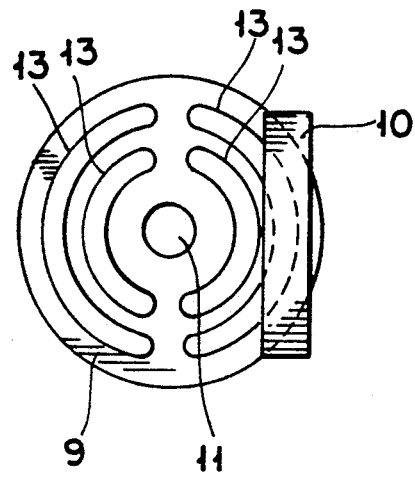
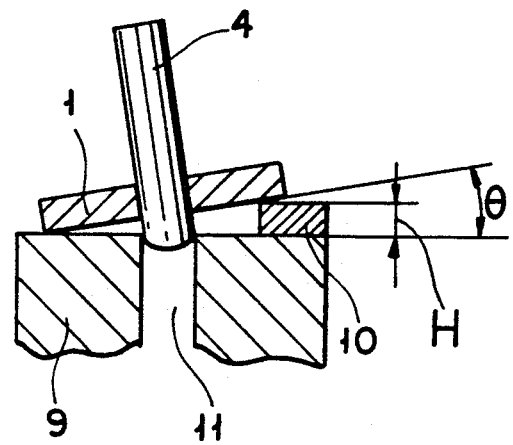
FIG. 1  FIG. 2
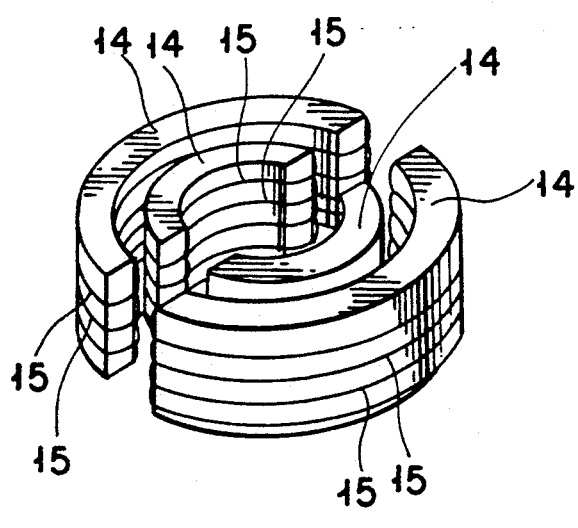
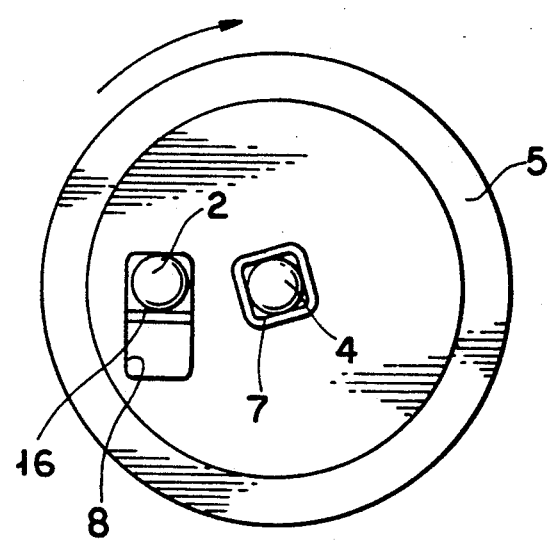
FIG. 3  FIG. 4

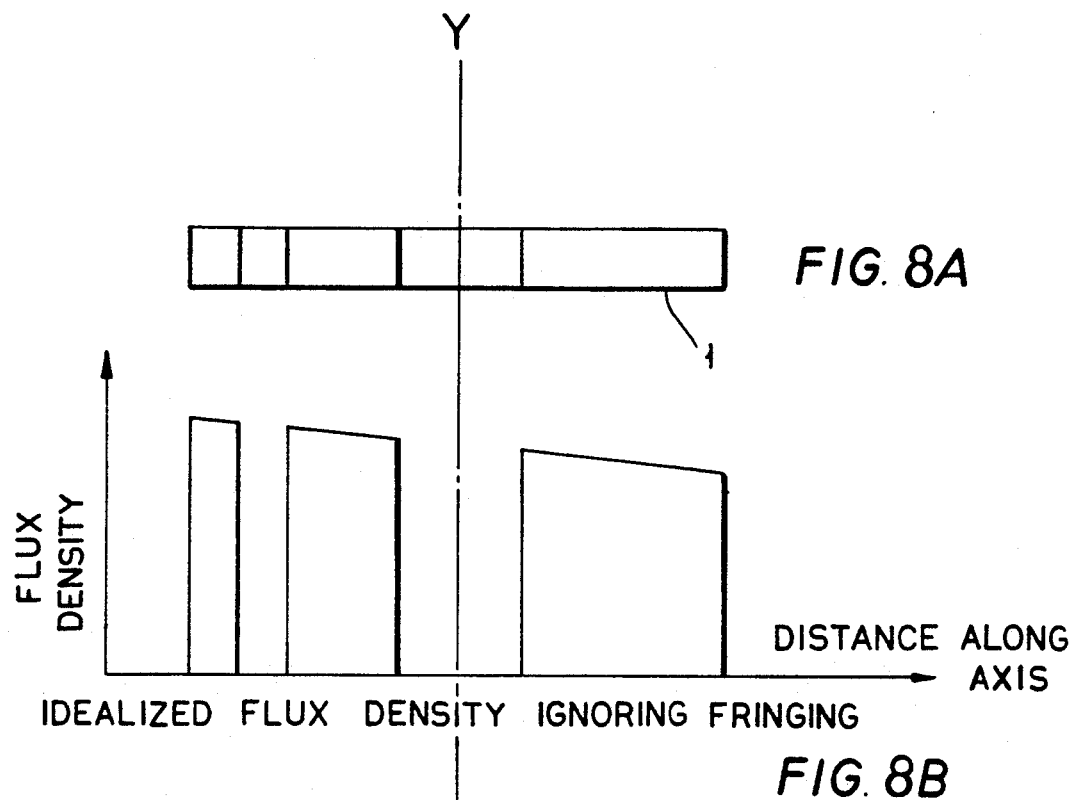
*FIG. 8A*
IDEALIZED FLUX DENSITY IGNORING FRINGING
*FIG. 8B*
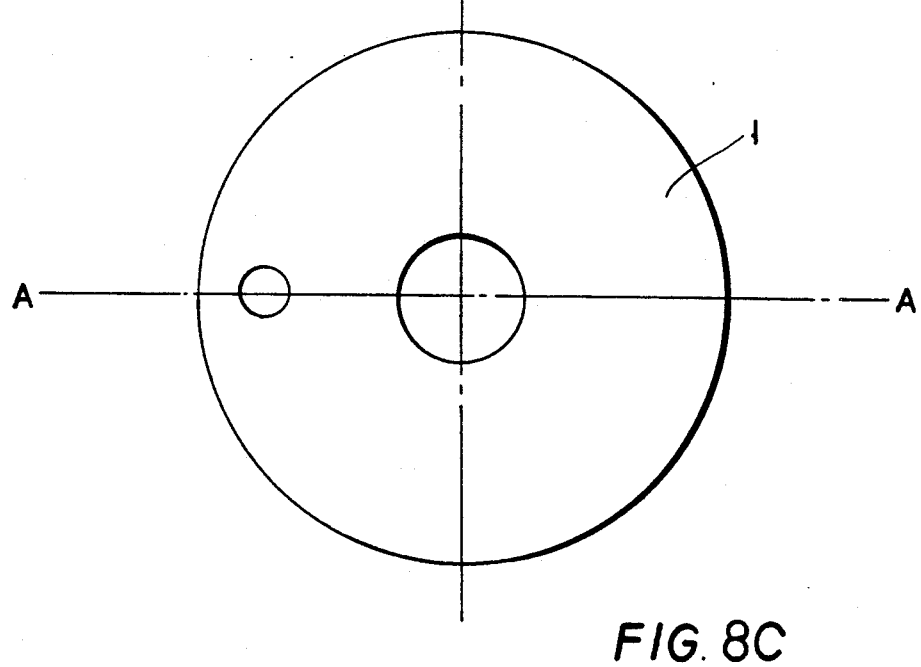
*FIG. 8C*

APPARATUS FOR PROVIDING UNIFORM ATTRACTIVE FORCE TO A MAGNETIC DISK HUB IN A MAGNETIC DISK DRIVE

BACKGROUND OF THE INVENTION

1. Field of the Invention

The present invention relates to an apparatus for rotating and driving a magnetic disk, and, more particularly, to the construction of a hub support thereof.

2. Description of the Prior Art

In a driving device for a floppy disk having a size of 3.5 inches, for example, an apparatus for rotating and driving a magnetic disk as shown in FIGS. 4 and 5 is used. In FIGS. 4 and 5, a hub support 1 is secured to a spindle 4 rotatively driven by a driving source such as a motor. A base of a plate spring 3 is secured to the back of the hub support 1, and a driving pin 2 is mounted on the extreme end of the plate spring 3. This driving pin 2 extends through a window hole of the hub support 1 and projects through the surface of the hub support 1. The hub support 1 is formed from a molded product, for example, such as plastic magnet material (powdered ferrite mixed in a resin material). The hub support 1 is magnetized to form a magnetic attraction surface whereby when a ferromagnetic metal hub 5 secured to a center of a magnetic disk is placed on the hub support 1, the hub support 1 attracts the hub by virtue of a magnetic attractive force. An extreme end of the spindle 4 is fitted into a center hole 7 of the metal hub 5, and a driving pin 2 is inserted into an engaging hole 8 of the hub formed at an off-center position of the metal hub 5 so that when the hub support 1 is rotatively driven integral with the spindle 4, the driving pin 2 abuts the end edge of the engaging hole 8. Thereby, the driving pin 2 urges the hub 5 externally in a radial direction to rotate the hub 5 and the magnetic disk integral therewith while positioning the hub 5. On the hub support 1, a stopper 16 is provided which serves to prevent driving pin 2 from moving to the rear of the engaging hole opposite to the rotation direction of the hub support 1 so that driving pin 2 abuts the end edge of the engaging hole 8.

Since the hub 5 is attracted by the magnetic attractive force caused by the hub support 1 as described above, when the magnetic disk is removed from the rotating and driving apparatus, it is necessary to move the hub 5 away from the hub support 1 against the aforesaid magnetic attractive force. F represents the magnetic attractive force.

It is necessary to magnetize the hub support 1 so that the metal hub 5 for the magnetic disk will be magnetically attracted by the hub support 1 as described above. FIGS. 6 and 7 show an example of a magnetizing head and a magnetizing method using this magnetizing head. As shown in FIGS. 6 and 7, the magnetizing head 9 has a flat upper surface on which the hub support 1 is closely placed, and an escape hole 11 for the spindle 4 is vertically bored in the center thereof. A coil 13 is wound about a suitable core so as to form a magnetic pole in a vertical direction of the magnetizing head 9, and is composed of plural layers wound in a radial direction.

When the hub support 1 is magnetized by use of the magnetizing head 9, the hub support 1 is closely placed on the upper end of the magnetizing head 9 as shown in FIG. 7 and electrical energy is applied to the coil 13 to develop a magnetic field.

According to the conventional magnetizing head of the hub support, uniform magnetic fluxes are generated approximately over the whole surface so that the hub support tends to be magnetized approximately with uniform strength over the whole surface. However, the hub support is not uniformly structured but a window hole is formed in the periphery of the driving pin so that the driving pin extends through with a spatial allowance about it, and therefore, the magnetic flux density in the periphery of the window hole is low. Moreover, since the engaging hole of the disk with the driving pin of the hub is superposed with respect to the window hole of the hub support, the magnetic attractive force in the periphery of the driving pin becomes weaker than in that of other parts of the hub support with the result that an imbalance between the magnetic attractive forces occurs and the disk hub cannot be smoothly mounted on and removed from the hub support.

In view of the above, proposals have been made as disclosed in Japanese Utility Model Application Laid-Open No. 62-147162 and Japanese Patent Application Laid-Open No. 62-197953 in which a thickness of a magnet provided on a hub support is made to be smaller than that of other parts in the peripheral portion of a driving pin, or a thickness of a portion opposed to the driving pin of the magnet is made to be small, the magnetizing force is weakened, or a magnetizing pitch is narrowed to form a weak magnetic attractive portion in a portion opposed to the driving pin of the magnet, so that a uniform magnetic attractive force is attained over the whole surface of the hub support.

However, according to the aforementioned publications, the magnetic flux density is merely divided stepwise. Accordingly, the magnetic attractive force is not uniformly generated over the whole surface of the hub support. It is necessary to use a magnet having a special shape or a special magnetizing head having a magnetizing pattern which is nonuniform. Particularly in the case where a complicated magnetizing pattern is required, it has been sometimes impossible to attain such pattern by the mechanical process of a magnetizing head and the winding of a magnetizing coil.

SUMMARY OF THE INVENTION

The present invention is directed to overcoming these problems noted above. An object of the invention, therefore, is to provide an apparatus for rotating and driving a magnetic disk wherein a magnetizing head is arranged in a simple but effective way to obtain a predetermined magnetizing pattern for magnetizing a hub support so that a magnetic disk hub ca be attracted to the hub support by an approximately uniform magnetic attractive force over the whole surface of a hub support.

According to one feature of the present invention, the hub support has a magnetic attractive surface which is high in magnetic flux density in the vicinity of the driving pin, the magnetic flux density becoming continuously and gradually lower along the hub support as a function of distance from the driving pin.

In the vicinity of the driving pin of a magnetic disk driving arrangement, there is a window hole of the hub support through which the driving pin extends, and an engaging hole of a hub of a disk is superposed relative to the window hole and the magnetic attractive force in that portion between hub support and disk hub would generally tend to be lowered. In accordance with the invention, however, the magnetic flux density in the vicinity of the driving pin is made to be high, and therefore, the lowering of the magnetic attractive force is compensated for. Furthermore, since the magnetic flux density continuously and gradually lowers as a function of distance from the driving pin, the magnetic attractive force varies smoothly, and the magnetic disk hub ca be attracted by approximately uniform net magnetic attractive force over the whole surface of the hub support.

For a better understanding of the present invention, reference is made to the following description and accompanying drawings, while the scope of the invention is printed out by the appended claims.

BRIEF DESCRIPTION OF THE DRAWINGS

In the drawings, FIG. 1 is a plan view showing an example of a magnetizing head capable of being utilized in the present invention;

FIG. 2 is a front view in section showing a hub support ready to be magnetized by the magnetizing head in a first embodiment of the invention;

FIG. 3 is a perspective view showing a coil within the magnetizing head;

FIG. 4 is a plan view showing an example of a state where a disk hub is placed on a hub support;

FIG. 8a and 8c are simplified cross section and plan views respectively of a hub support and FIG. 8b is an idealized graphical representation of the magnetic flux density of the hub support in accordance with the present invention;

DETAILED DESCRIPTION OF THE PREFERRED EMBODIMENTS

Figure 5:
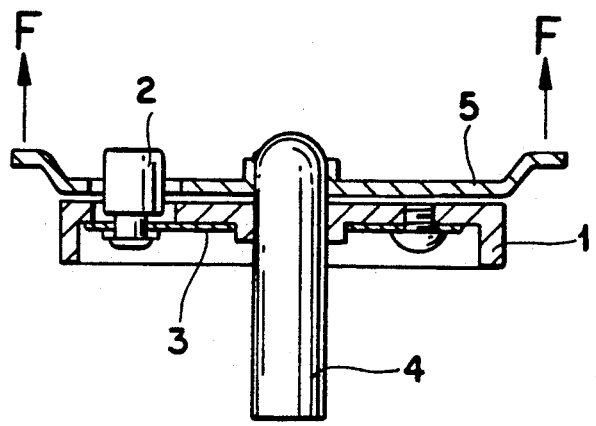
FIG. 5 is a front view in section of the view of FIG. 4.
Figure 6:
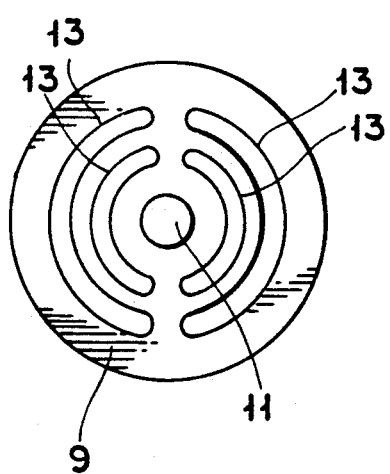
FIG. 6 is a plan view showing a conventional magnetizing head which uses the magnetization of the hub support.
Figure 7:
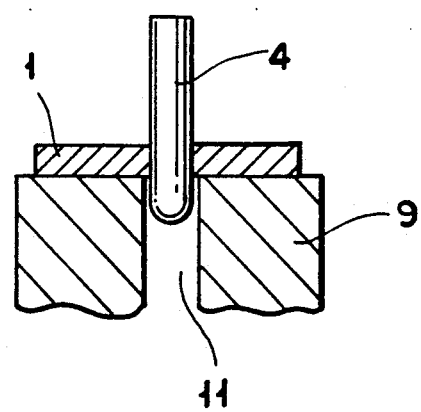
FIG. 7 is a front view in section showing a state where a hub support is magnetized by use of the magnetizing head.

An embodiment of an apparatus for rotating and driving a magnetic disk according to the present invention will be described with reference to FIGS. 1 to 3. The hub support and the spindle, per se, have the same structure as that of the prior art, and therefore, only the principal portions of the structure of the present invention will be specifically described.

Referring to FIGS. 1 to 3, a magnetizing head indicated at 9 is the same as a general and simple magnetizing head used in the magnetization of a conventional hub support. The magnetizing head has a flat upper surface on which a hub support 1 is closely placed. An escape hole with respect to a spindle 4 is vertically provided in the center portion. Within the magnetizing head 9, a coil 15 is wound about a semicircular core 14 on both sides of the escape hole 11 with the latter sandwiched therebetween. The coil 15 is wound about the core 14 so as to form a magnetic pole in a vertical direction of the magnetizing head 9 and is wound in plural layers in a radial direction.

The structure of a spindle hub formed with the magnetic attractive surface by use of the aforesaid magnetizing head 9 is not particularly limited to one specific structure. However, in this example, a resin-cased magnet is injection-molded onto a spindle 4 to form a hub support 1, and a plate spring 3 supporting a driving pin 2 is secured to the hub support, i.e., similar to the spindle hub described in connection with FIGS. 4 and 5.

Referring to FIGS. 1 and 2, where the magnetizing head 9 is used to form a magnetic attractive surface on the hub support 1, in a first embodiment, a plate 10 having a thickness H is placed on one edge portion of the upper surface of the magnetizing head 9. One edge of the hub support 1 is placed on the upper surface of the magnetizing head 9, and the hub support 1 is inclined by an angle Θ with respect to the upper surface of the magnetizing head 9. A preferred range of Θ for magnetizing a hub support for a 3.5 inch disk is 3.30°–4.80°. The height of the plate (depending on its placement) is preferably 1.4 mm–2.0mm. The driving pin mounting side of the hub support 1 is directly placed on the upper surface of the magnetizing head 9, and the side opposite to the driving pin mounting side with the spindle 4 sandwiched therebetween is placed on the plate 10. The spindle 4 is inserted into an escape hole 11 of the magnetizing head 9. In this state, the coil 15 is energized to magnetize both ends of the core 14 to N-pole and S-pole, respectively, whereby the hub support 1 is magnetized to form a magnetic attractive surface.

The result of this arrangement is that the hub support 1 is inclined by an angle of Θ with respect to the upper surface of the magnetizing head 9. The distance from the driving pin mounting portion of the hub support to the magnetizing head is small, while the distance from the magnetizing head 9 to the hub support portion which is away from the driving pin mounting portion, is large. Accordingly, the applied magnetizing force is greater in the vicinity of the driving pin and the magnetizing force continuously and gradually weakens in a direction away from the driving pin. This results in that the hub support has a magnetic attractive surface which is high in magnetic flux density in the vicinity of the driving pin and continuously and gradually weakens in magnetic flux density as a function of distance from the driving pin.

A somewhat simplified and idealized representation of the flux density of the hub support as a function of the distance along the hub support is shown in FIGS. 8a, 8b and 8c. In the vicinity of the window hole of the hub support and at the central hole for the spindle, the flux density is very low (near 0). Otherwise, the magnetic flux density after magnetization is highest in the vicinity of the window hole and gradually and continuously lowers in a direction away from the window hole. That is to say, the magnetic flux density along a line through the center of the window hole and central hole is greatest near the end of the line nearest the window hole and, except for the zone of the holes, gradually and continuously decreases to be least at the end of a line furthest from the window hole.

This achieves the desired goal that, if one considers a diameter perpendicular to a line through the window and central holes, the total flux on one side of the diameter is substantially equal to the total flux on the other side of the diameter. The result will be that the hub of the magnetic disk will be held sufficiently uniformly along the surface of the hub support to facilitate mounting and removing a magnetic disk from the hub support in uniform fashion.

More specifically, when the metal hub 5 of the disk is placed on the thus magnetized hub support 1 and positioned to a predetermined position, the engaging hole 8 of the disk hub 5 is superposed with respect to a portion of the hub support in the vicinity of the driving pin 2 which is highest in magnetic flux density. The magnetic attractive force lowers in the portion of the engaging hole but the magnetic flux density of the surrounding portion has been increased to thereby compensate for the lowered magnetic attractive force. Further, the magnetic flux density continuously lowers in the direction away from the driving pin 2 with the result that the hub 5 of the magnetic disk is attracted by approximately uniform net magnetic attractive force over the whole surface of the hub support 1. When the hub 5 is removed from the hub support 1, it can be removed by applying uniform force against uniform magnetic attractive force. By such arrangement, the hub can be smoothly mounted and removed.

Figure 9:
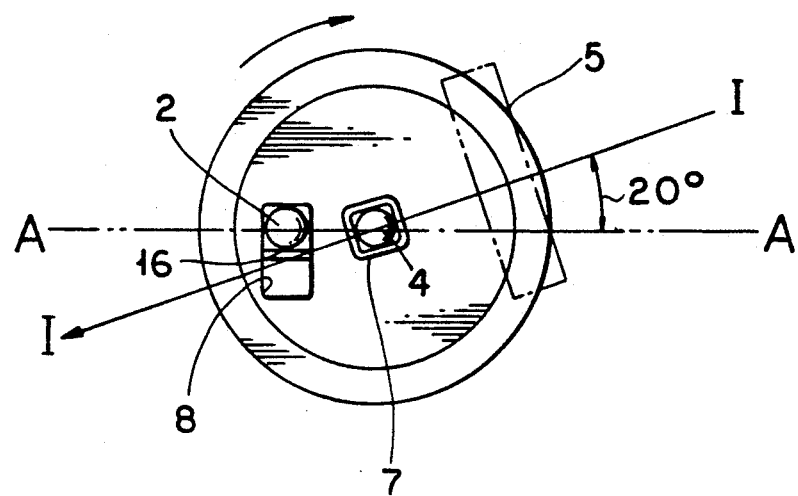
FIG. 9 is a plan view of a preferred arrangement of the embodiment of the present invention shown in FIGS. 1 and 2 showing a preferred placement of the plate 10.

In a preferred arrangement for magnetizing the hub support as shown in FIG. 9, the plate 10 is set perpendicular to a line through the center (I—I) rotated 20° from a diameter (A—A) extending through the window hole and spindle hole. This arrangement compensates for the fact that a portion of the engaging hole 8 is not attracted to the hub support at this point.

The plate 10, described above, is non-ferromagnetic and may be composed of brass, aluminum or a non-ferromagnetic resin material.

According to the above-described magnetizing method and arrangement, the distribution of the magnetic flux density of the magnetic attractive surface of the hub support 1 can be varied by arranging a plate 10 with respect to the magnetizing surface of magnetizing head. The magnetizing head has been shown to be a general and simple type without requiring complicated structure. Therefore, the hub support 1 can be easily magnetized, and the manufacturing cost of the magnetizing head 9 can be reduced. Furthermore, various desired magnetizing patterns can be obtained merely by changing the thickness H of plate 10 placed on the magnetizing head 9. The need for different magnetizing patterns results from differences in the shape and dimension of the window hole, the material of the hub support and the magnetizing current of the magnetizing head.

Figure 10:
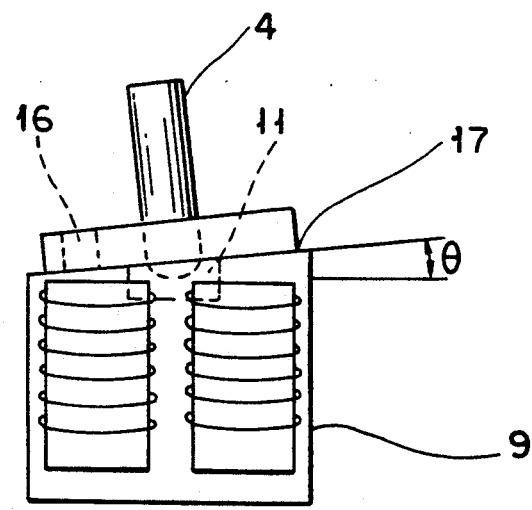
FIG. 10 is a front view in section of a second embodiment of the present invention.

Referring to FIG. 10, another embodiment is shown wherein the place for continuously changing the magnetic flux density of the hub support 1 may be provided integral with the magnetizing head 9, i.e., the upper surface 17 of the magnetizing head may be inclined by the desired angle Θ to the plane of the top of the coils in order to change the magnetizing pattern. Modification may also be made to the magnetizing head by having the number of windings on one side of the magnetizing coil to be different from the other side or different materials may be used for the coil.

It is further to be noted that the hub support itself need not be formed from a resin magnet but may be a magnetizable magnet portion either mounted on or embedded into the hub support.

The present invention, then, is directed to the problem occurring when the metal hub of a disk is placed on a hub support and positioned to a predetermined position, and the engaging hole of the disk hub with associated lowered magnetic attractive force is superposed to the portion of the hub support in the vicinity of the driving pin. According to the present invention, the magnetic flux density of the hub support in the vicinity of the driving pin is increased to thereby compensate for the lowering of the magnetic attractive force in the vicinity of the driving pin, and the magnetic flux density of the hub support continuously and gradually lowers as a function of distance from the driving pin with the result that the hub of the magnetic disk can be attracted by approximately uniform magnetic attractive force over the entire surface of the hub support.

While the foregoing description and drawings represent the preferred embodiments of the present invention, it will be obvious to those skilled in the art that various changes and modifications may be made therein without departing from the true spirit and scope of the present invention.

What is claimed is:

1. In an apparatus for rotating and driving a magnetic disk in which a hub of a magnetic disk is magnetically attracted by a hub support, and wherein a driving pin is provided on said hub support which extends through a window hole in said hub support, said driving pin for being inserted in an engaging hole of said hub, the improvement comprising that said hub support has means for producing a magnetic attractive surface which is relatively highest in magnetic flux density in the vicinity of said window hole and driving pin and which gradually decreases in magnetic flux density as a function of distance from said window hole and driving pin, said hub support thereby providing a substantially uniform net attractive force to the magnetic disk hub over the entire surface of said hub support.

2. A magnetic hub support for supporting and magnetically attracting the hub of a magnetic disk wherein said support has an off-center opening to enable a drive pin to extend therethrough, a center shaft opening for receiving a spindle, and means for producing a magnetic flux density wherein the magnetic flux density along a line through the center of said openings is greatest near the end of said line nearest to said off-center opening and, except for an area of said openings, gradually decreases to being least at the end of said line furthest from said off-center opening.

3. A method for magnetizing a hub support for use in an apparatus for rotating and driving a magnetic disk wherein said hub support includes a window hole for allowing a driving pin to extend therethrough, said hub support being driven by a rotational shaft in said apparatus, said method comprising the steps of:

forming an assembly of a non-magnetized hub support having a rotational shaft immovably and centrally mounted therein; said hub support being composed of magnetizable material and having a window hole at a peripheral portion thereof; said assembly allowing a tip of said shaft to extend through said hub support;

providing a magnetizing head having a central aperture, and a coil arrangement, said coil arrangement having a top plane area substantially perpendicular to the longitudinal axis of said magnetizing head;

arranging a bearing support at the top of said magnetizing head so that a hub support when placed on said bearing support will form a predetermined angle relative to the top plane area of said coil arrangement;

inserting the extended shaft tip of said assembly into said magnetizing head aperture so that the hub support rests on the bearing support, the portion of said hub support having a window hole resting close to the vertex of said angle; and magnetizing said hub support by applying a predetermined quantity of electrical energy to said magnetizing head to produce a substantially uniform net attractive force over the entire surface of said hub support.

4. The method of claim 3 wherein the arranging step includes the step of selecting the angle value to produce a desired magnetizing pattern.

5. The method of claim 3 wherein the magnetizing head has a top surface which is substantially parallel to said top plane area of said coil arrangement and wherein said bearing support includes a non-ferromagnetic plate placed across a peripheral portion of said top surface, said plate having a predetermined thickness and said inserting step includes inserting the tip of the assembly into the magnetizing head aperture so that the portion of the hub having a window hole rests on the top surface of the magnetizing head and the portion of the hub support substantially diametrically opposed to said engaging hole rests on said plate so as to form a predetermined angle between the hub support and the top surface of said monetizing head.

6. The method of claim 3 wherein the magnetizing head includes a top surface arranged at an angle Θ with respect to the top plane area of the coil arrangement and said bearing support is provided by said top surface.

7. A hub support for use in an apparatus for rotating and driving a magnetic disk wherein the hub support includes a window hole for allowing a driving pin to extend therethrough, said hub support being driven by a rotational shaft in the apparatus, the hub support being produced by a method comprising the steps of: forming an assembly of a non-magnetized hub support having a rotational shaft immovably and centrally mounted therein; said hub support being composed of magnetizable material and having a window hole at a peripheral portion thereof; said assembly allowing a tip of said shaft to extend through said hub support;

providing a magnetizing head having a central aperture, and a coil arrangement, said coil arrangement having a top plane area substantially perpendicular to the longitudinal axis of said magnetizing head;

arranging a bearing support at the top of said magnetizing head so that a hub support when placed on said bearing support will form a predetermined angle relative to the top plane area of said coil arrangement;

inserting the extended shaft tip of said assembly into said magnetizing head aperture so that the hub support rests on the bearing support, the portion of said hub support having a window hole resting close to the vertex of said angle; and magnetizing said hub support by applying a predetermined quantity of electrical energy to said magnetizing head to produce a substantially uniform net attractive force over the entire surface of said hub support.

8. A hub support for use in an apparatus for rotating and driving a magnetic disk, wherein the hub support includes a window hole for allowing a driving pin to extend therethrough, said hub support being driven by a rotational shaft in the apparatus, the hub support being produced by a method comprising the steps of: forming an assembly of a non-magnetized hub support having a rotational shaft immovably and centrally mounted therein; said hub support being composed of magnetizable material and having a window hole at a peripheral portion thereof; said assembly allowing a tip of said shaft to extend through said hub support;

providing a magnetizing head having a central aperture, and a coil arrangement, said coil arrangement having a top plane area substantially perpendicular to the longitudinal axis of said magnetizing head;

arranging a bearing support at the top of said magnetizing head so that a hub support when placed on said bearing support will form a predetermined angle relative to the top plane area of said coil arrangement;

inserting the extended shaft tip of said assembly into said magnetizing head aperture so that the hub support rests on the bearing support, the portion of said hub support having a window hole resting close to the vertex of said angle; and magnetizing said hub support by applying a predetermined quantity of electrical energy to said magnetizing head to produce a substantially uniform net attractive force over the entire surface of said hub support;

wherein the magnetizing head has a top surface which is substantially parallel to said top plane area of said coil arrangement and wherein said bearing support includes a non-ferromagnetic plate placed across a peripheral portion of said top surface, said plate having a predetermined thickness and said inserting step includes inserting the top of the assembly into the magnetizing head aperture so that the portion of the hub having a window hole rests on the top surface of the magnetizing head and the portion of the hub support substantially diametrically opposed to said engaging hole rests on said plate so as to form a predetermined angle between the hub support and the top surface of said magnetizing head.

9. A hub support, wherein the hub support includes a window hole for allowing a driving pin to extend therethrough, said hub support being driven by a rotational shaft in the apparatus, the hub support being for use in apparatus for rotating and driving a magnetic dick produced by a method comprising the steps of: forming an assembly of a non-magnetized hub support having a rotational shaft immovably and centrally mounted therein; said hub support being composed of magnetizable material and having a window hole at a peripheral portion thereof; said assembly allowing a tip of said shaft to extend through said hub support;

providing a magnetizing head having a central aperture, and a coil arrangement, said coil arrangement having a top plane area substantially perpendicular to the longitudinal axis of said magnetizing head;

arranging a bearing support at the top of said magnetizing head so that a hub support when placed on said bearing support will form a predetermined angle relative to the top plane area of said coil arrangement;

inserting the extended shaft tip of said assembly into said magnetizing head aperture so that the hub support rests on the bearing support, the portion of said hub support having a window hole resting close to the vertex of said angle; and magnetizing said hub support by applying a predetermined quantity of electrical energy to said magnetizing head to produce a substantially uniform net attractive force over the entire surface of said hub support;

wherein the magnetizing head includes a top surface arranged at an angle Θ with respect to the top plane area of the coil arrangement and said bearing support is provided by said top surface.

10. In an arrangement for magnetizing a hub support for use in an apparatus for rotating and driving a magnetic disk, said hub support having a window hole for allowing a pin to extend therethrough, said arrangement including a magnetizing head having a central aperture for receiving an assembly of a rotational shaft and hub support and for magnetizing said hub support, the improvement comprising:

a non-ferromagnetic plate disposed on a peripheral portion of a top surface of said magnetizing head for providing a canting angle between a surface of said hub support and a top surface of said magnetizing head when said assembly of hub support and shaft is arranged on said magnetizing head prior to magnetization with said window hole portion being nearest the vertex of said angle, so that, upon applying electrical energy to said magnetizing head, said hub support surface will have a high magnetic flux density in the vicinity of said window hole and a gradually lowering magnetic flux density as a function of distance from said window hole for providing a substantially uniform net attractive force to a magnetic disk hub over the entire surface of said hub support.

11. The arrangement of claim 10 wherein said plate is affixed to the top surface of said magnetizing head by appropriate means.

12. The arrangement of claim 10 wherein said plate has a prescribed thickness for providing a predetermined pattern of magnetization to said hub support.

13. In an arrangement for magnetizing a hub support for use in an apparatus for rotating and driving a magnetic disk, said hub support having a window hole for allowing a pin to extend therethrough, said arrangement including a magnetizing head having a central aperture, a coil arrangement having a top plane area substantially perpendicular to the longitudinal axis of said magnetizing head, and a top surface for receiving an assembly of a rotational shaft and hub support and for magnetizing said hub support, the improvement comprising:

that said top surface of said magnetizing means is formed at a predetermined angle with respect to the plane area of said coil arrangement, said assembly being arranged on said magnetizing head prior to magnetization with said window hole portion being nearest the vertex of said angle, so that, upon applying electrical energy to said magnetizing head, said hub support surface will have a high magnetic flux density in the vicinity of said window hole and a gradually lowering magnetic flux density as a function of distance from said window hole for providing a substantially uniform net attractive force to a magnetic disk hub over the entire surface of said hub support.

* * * * *